Jan. 18, 1966 W. FRASER 3,229,794
HYDRAULIC COUPLINGS
Filed March 11, 1963 6 Sheets-Sheet 1
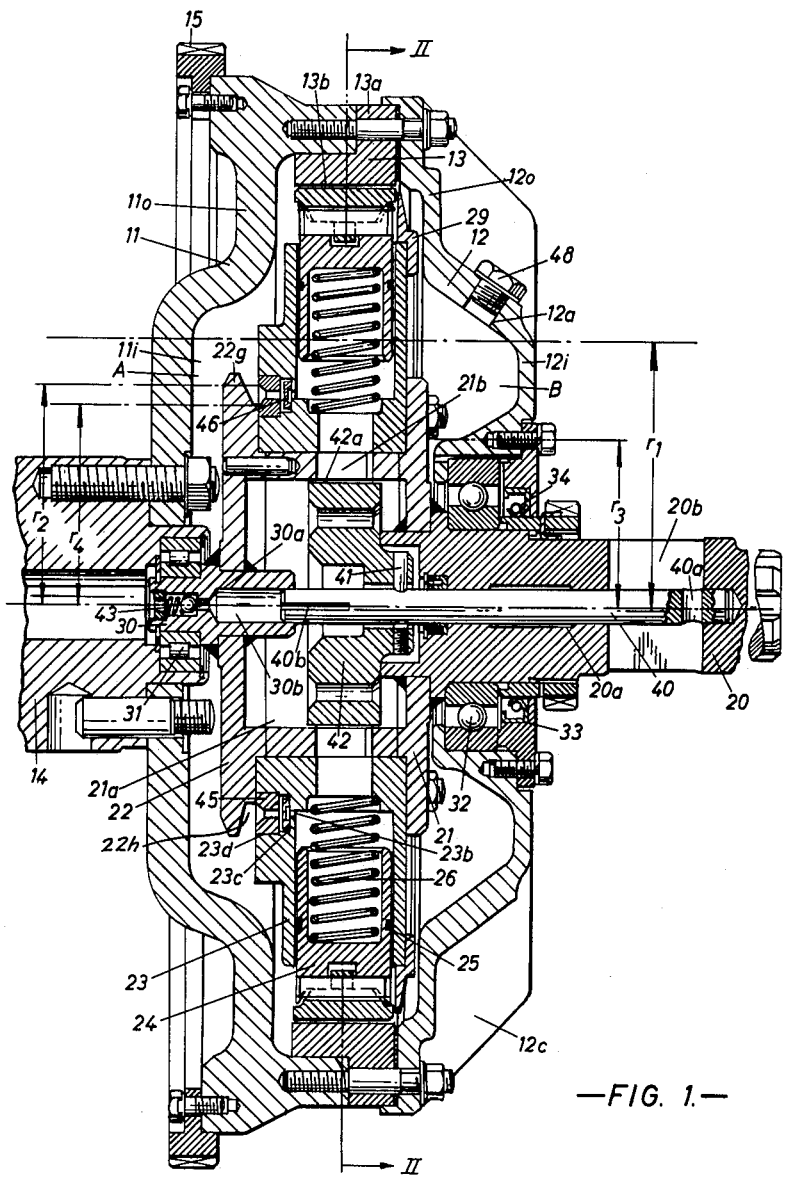
—FIG. 1.—
INVENTOR
WILLIAM FRASER, DECEASED.
BY DOROTHY FRASER,
WILLIAM FRASER, Jr.
HARDMAN FRASER PHILLIPS,
EXECUTORS.
BY Miles Kensinger
ATTORNEY Jan. 18, 1966 W. FRASER 3,229,794
HYDRAULIC COUPLINGS
Filed March 11, 1963 6 Sheets-Sheet 2
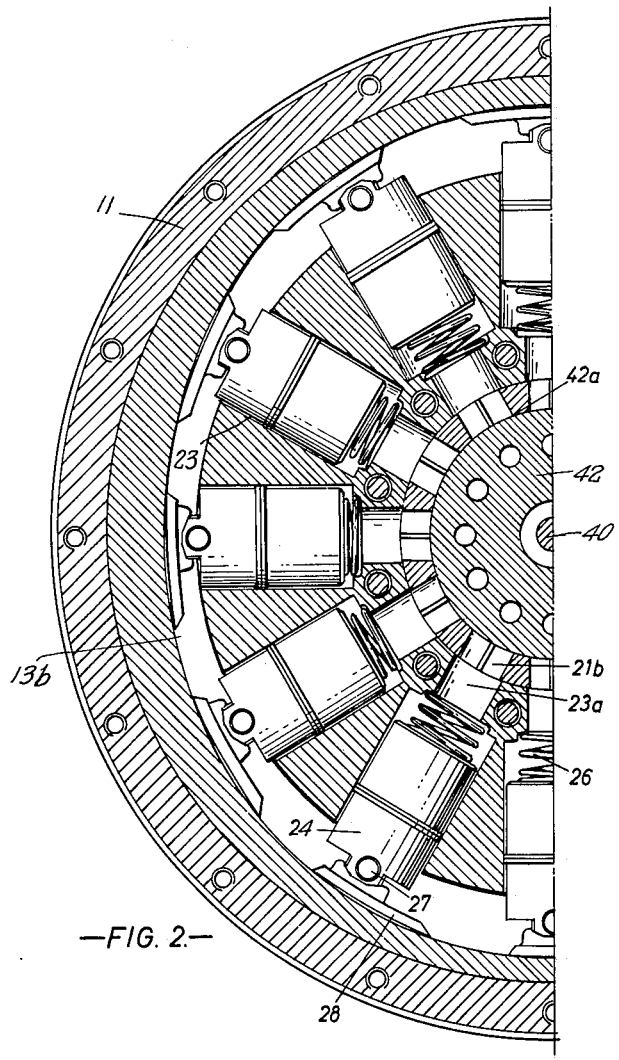
—FIG. 2.—
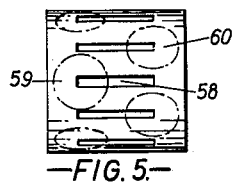
—FIG. 5.—
—FIG. 4a.—
—FIG. 4b.—
INVENTOR
WILLIAM FRASER, DECEASED,
BY DOROTHY FRASER,
WILLIAM FRASER, Jr.
HARDMAN FRASER PHILLIPS,
EXECUTORS.
BY Miles Henninger
ATTORNEY

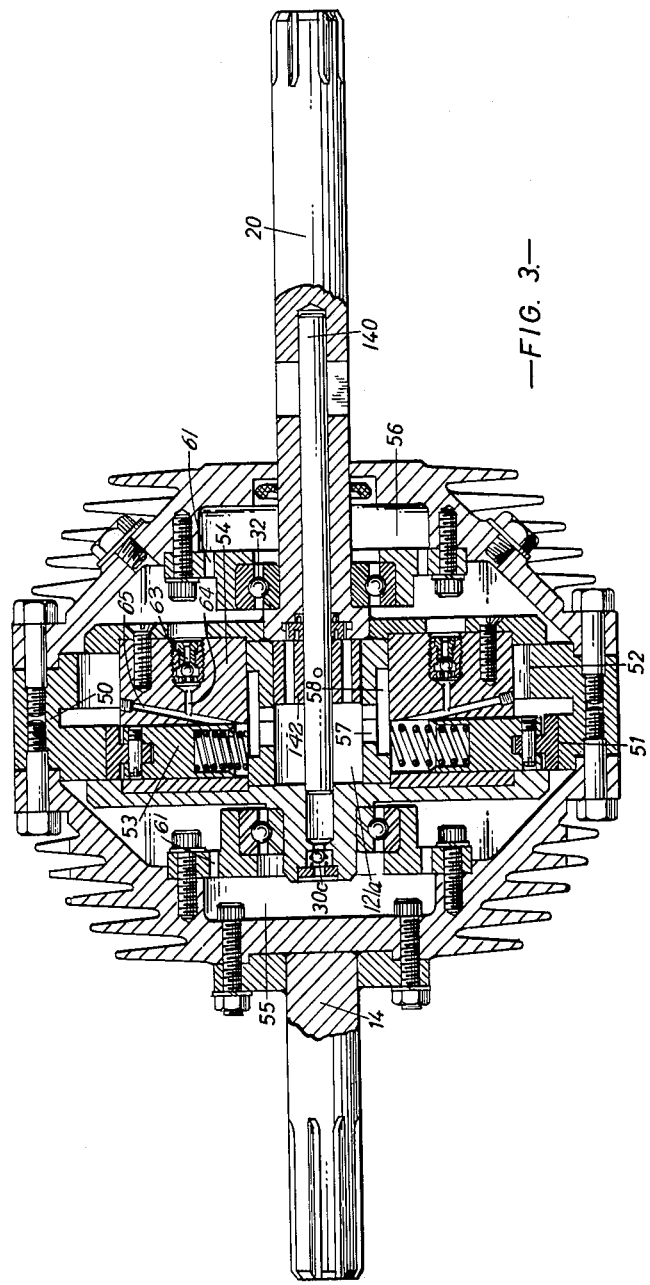

Jan. 18, 1966 W. FRASER 3,229,794
HYDRAULIC COUPLINGS
Filed March 11, 1963 6 Sheets-Sheet 4
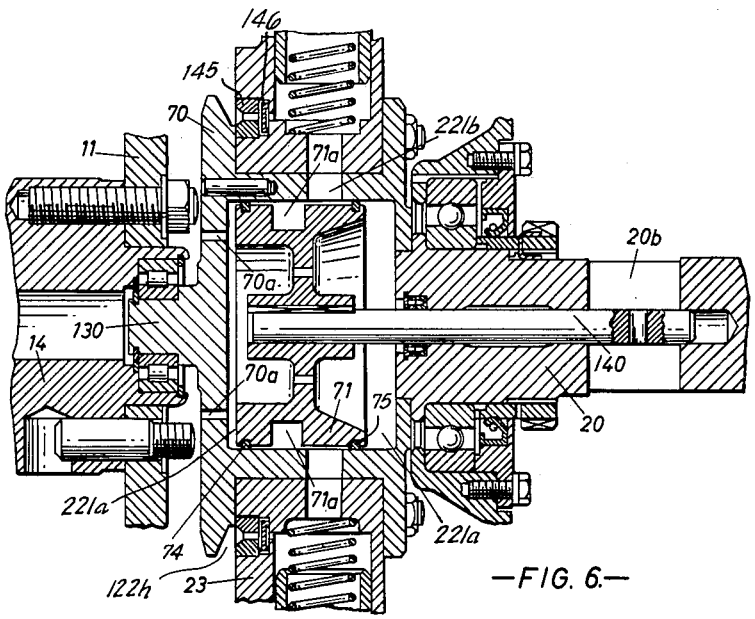
—FIG. 6.—
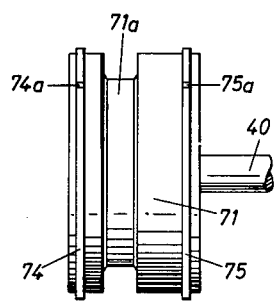
—FIG. 7.—
INVENTOR
WILLIAM FRASER, DECEASED.
BY DOROTHY FRASER.
WILLIAM FRASER, Jr.
HARDMAN FRASER PHILLIPS
EXECUTORS.
BY *Miles Kenninger*
ATTORNEY

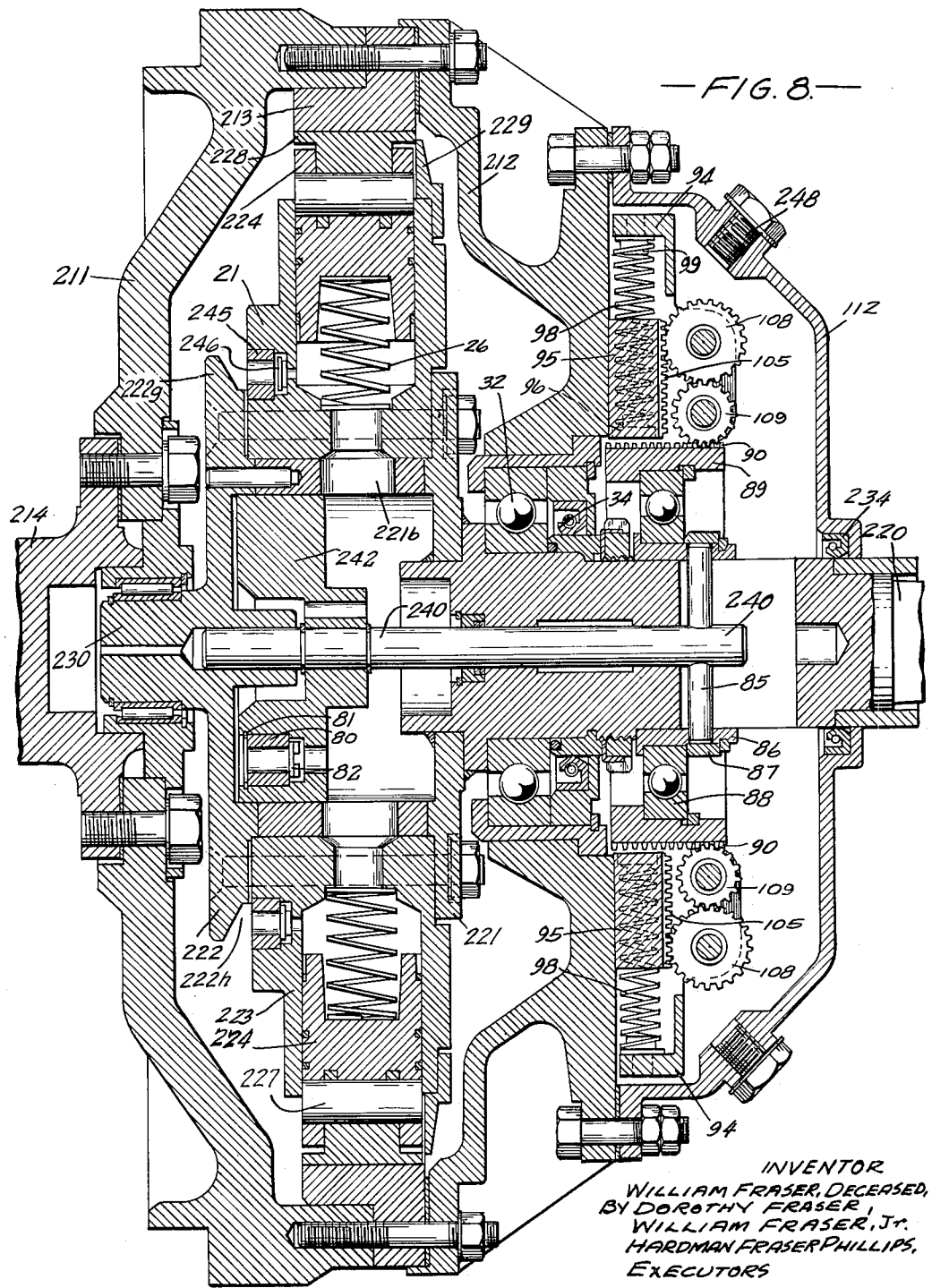

Jan. 18, 1966  W. FRASER  3,229,794
HYDRAULIC COUPLINGS
Filed March 11, 1963  6 Sheets-Sheet 6
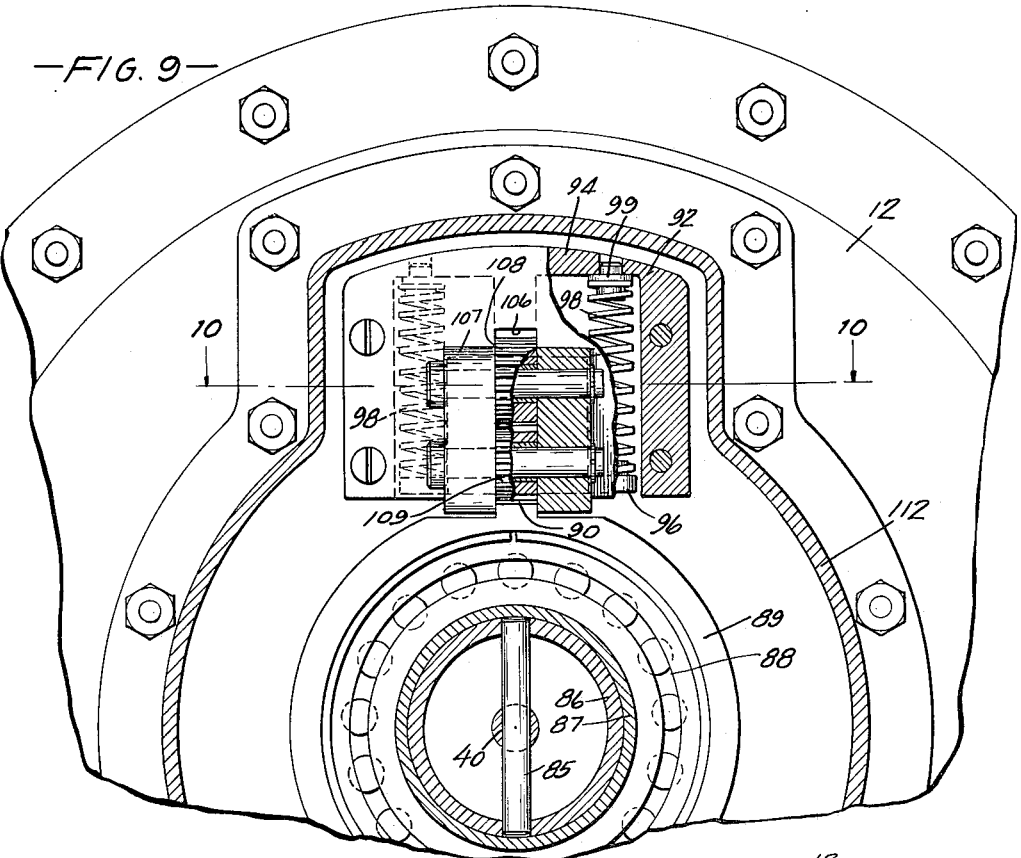
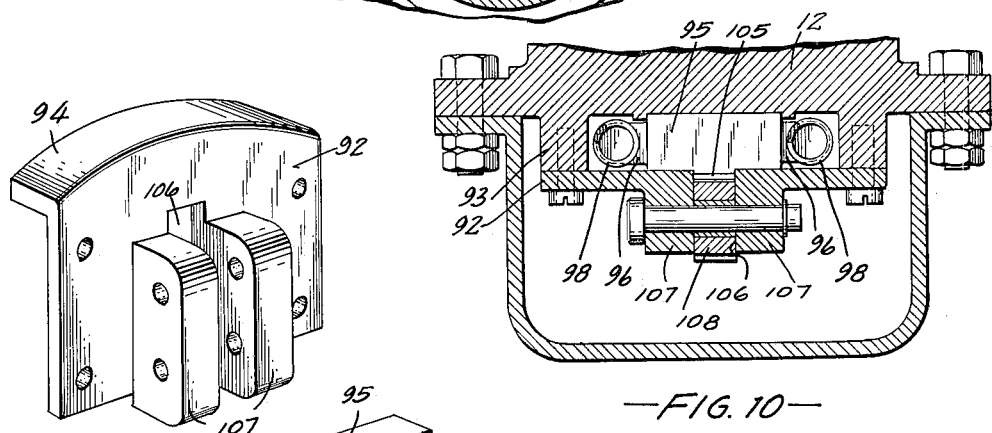
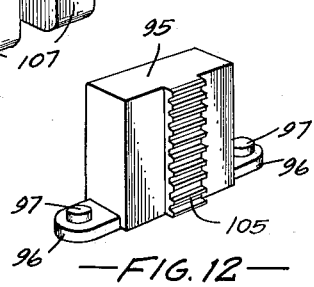
INVENTOR
WILLIAM FRASER, DECEASED,
BY DOROTHY FRASER
WILLIAM FRASER, Jr.
HARDMAN FRASER PHILLIPS,
EXECUTORS
BY Miles Kenninger
ATTORNEY United States Patent Office 3,229,794
Patented Jan. 18, 1966

3,229,794
HYDRAULIC COUPLINGS
William Fraser, deceased, late of Liverpool, England, by Dorothy Fraser, Liverpool, William Fraser, Jr., Hightown, near Liverpool, and Hardman F. Phillips, Puddington, Wirral, England, executors, assignors to The Fraser Hydraulic Transmission Company, Liverpool, England, a corporation of Great Britain
Filed Mar. 11, 1963, Ser. No. 264,456
7 Claims. (Cl. 192—60)

This application is a continuation-in-part of S.N. 779,429 filed December 10, 1958, now abandoned.

This invention relates to improvements in hydraulic couplings of the kind in which power is transmitted from one shaft or element to another shaft or element by varying the pressure of a coupling rotor on a cam on a rotating coupling casing.

Generally, the coupling comprises a casing on a first shaft, and is provided with a cam adapted to reciprocate pistons in radially disposed cylinders in a rotor on a second shaft, relative rotation between the casing and the rotor causing fluid to pass into and out of the cylinders, dependent on the position of a control valve within the rotor to effect any desired resistance to flow and consequent reaction causing variation in the torque and speed transmitted from the first shaft to the second shaft.

Oil losses from the cylinders beneath the pistons, the control valve chamber and the ducts therebetween (all of which constitute a pressure zone in the rotor) must be replaced from a reservoir zone between the casing and the rotor from which oil is drawn into the pressure zone by way of non-return replenishment valves. The inlets to the replenishment valves must have continual access to the oil during operation of the coupling, as otherwise air will be taken into the cylinders of the rotor and the action of the coupling will be rendered less effective.

In filling such coupling initially, oil is fed into the casing to a static level. The maximum level to which the coupling may be filled while it is stationary, is determined by suitably locating a filler plug on the outer casing. The position of the filler plug must, of course, be such, that when oil is supplied to come up to the filler opening level and the replenishment valves are thus flooded, sufficient unfilled space remains in the casing reservoir zone to allow for subsequent expansion of the oil under heat, otherwise the pressure inside the casing could exceed the holding capacity of the seals or even cause bursting of the casing.

When the clutch is rotated, the oil in the reservoir zone is centrifugally swirled outward from the static level and all the levels assumed by the oil shall be such that the replenishment valves are submerged. The replenishment valve inlets will be well flooded, with oil in liquid form beyond any fringe layer of oil-air emulsion, for replenishment of oil to the cylinders upon loss past the pistons and through the central rotor duct and thus will keep the pressure zone full of centrifuged oil (free from air).

In the static state of the coupling, air pockets may develop in the cylinders, and differential rotation of the casing and the rotor is required to reciprocate the pistons to displace the air and/or air-oil emulsion from the cylinders and to cause the pressure zone to become completely full of oil. Thereafter, a further supply of oil must be introduced into the reservoir zone to replace the oil which has been drawn into the pressure zone. Oil is drawn into the individual cylinders via the replenishment valves as movement of the pistons produces reduced cylinder pressures, thereby discharging much of the initial air content from the pressure zone via a duct near the rotor center and which leads out of the pressure zone in the rotor.

The invention is based on experience indicating that the following four conditions ensure efficient operation, namely:

(a) The replenishment valve inlets shall communicate more or less directly (axially of the casing) with the reservoir zone because flow of oil into passages extending radially outwards from such inlets, would be opposed to centrifugal force when the oil is in the centrifugally swirled condition;

(b) Adequate air space shall be provided within the casing in the reservoir zone to compensate for expansion of heated air and oil during operation;

(c) The filler aperture or other means which defines the static level of oil shall be positioned to ensure that in all conditions, the replenishment valve inlets are flooded with oil; and (d) There shall be a sufficient reserve of oil in the casing for continued efficient operation despite oil losses from the coupling during running over a considerable period of time.

The present invention calls for an outer casing in which there is substantial oil capacity in a midregion ($r_1$ minus $r_3$) of annular shape and of substantial axial length. The larger radius $r_1$ of the midregion is greater than the radius of the largest circle passing through the replenishment inlets and the smaller radius $r_3$ is smaller than the smallest circle through the replenishment inlets. The reservoir space within the casing and radially outward from the midregion (accommodating air when the coupling is in static condition and accommodating the oil in the reservoir zone when the coupling is operating), is of relatively small mean axial length. Thus as shown in (FIG. 1), the expansion space is a relatively small fraction of the volume of space in the casing below the static oil level (25 cubic inches expansion space as compared to 350 cubic inches space filled with oil in a coupling structure in experimental use).

The portion of the outer casing above the static oil ($r_1$) level (25 cubic inches) accommodates air and provides for a reserve of oil when the coupling is in operation. Where the shape of the outer casing and consequently the available space between it and the rotor is not limited in any way, the desired reservoir space would be a matter of design. Where the outer casing is formed by the face of a standard flywheel, to which it is to be connected, the contour of the flywheel face may cause reservoir space larger than necessary and this is operationally incorrect. In such case the excess space at the periphery of the casing is filled with one or more make-up pieces of such size as to leave remaining space in the reservoir only sufficient for the primary filling and subsequent rotational action of the coupling.

The walls of the outer casing are formed to provide an outwardly extending annular space constituting an annular oil storage cavity within the reservoir and disposed at such radial position that, during initial filling of the coupling, this annular storage cavity will accommodate a quantity of oil which will move radially outward but will provide a centrifuged ring of oil sufficient to flood the inlets of all the replenishment valves when the coupling is rotating. In a design wherein the annular peripheral reservoir space is too large, oil passing into the space under centrifugal action would expose the replenishment inlets to air and render the coupling inoperative. In the coupling in experimental use, the midregion of the coupling and which is full of oil during operation, is approximately four inches in radius and the replenishment inlets are within that radius, the volume of such midregion being approximately fifty cubic inches.

The coupling includes an outer casing and an inner rotor, the rotor including pistons to reciprocate in cylinders and to exhaust oil into and receive oil from a valve chamber, the passage of oil from and to the cylinders being controlled by a sliding valve in the chamber and air and/or excess oil being released from the valve chamber by a pressure release valve. In a modified form the rotor pistons exhaust oil into and receive oil from an annular groove in a sliding valve, the annular groove being open to all the radial cylinder ducts when the coupling is disengaged and closed to the cylinder ducts when the coupling is engaged, the sliding valve chamber communicating freely with the outer casing reservoir zone. To reduce the oil losses the valve is preferably provided with piston rings. The sliding valve is actuated by a rod slidably retained in one of the shafts, the valve rod being displaced by a sliding sleeve mounted for rotation with the rod retaining shaft and engaging the valve rod by way of a pin passing through a slot in the rod retaining shaft.

The oil ducts from each cylinder group are all arranged to open on the same circumferential area of the control valve, to avoid setting up a couple with the control valve and to balance the radial hydraulic pressures on the valve, by inclining the oil ducts relative to the vertical or by allowing the oil to discharge into a slot of relatively long axial length.

The rotor has a flange adjacent the replenishment inlets, the outer radius of the flange being greater than the radius of the largest circle intersecting the replenishment inlets and the inner radius of the flange being smaller than the radius of the smallest circle intersecting the replenishment inlets and providing a groove retaining oil at the inlets.

The cam track on which bear convex pads or slippers mounted at the ends of the pistons, may have an elliptical configuration. However, improved action of cam and slipper cam-followers, is obtained by providing a plurality of cam surfaces arranged one beside the other, each adapted to reciprocate a corresponding group of pistons in the rotor, the cam surfaces being out of phase with one another. Placing the cam surfaces out of phase is most effective when the surfaces are displaced relative to one another by an angle of $360°/n$ where $n$ is the number of cam surfaces and associated piston groups. Preferably the cam track is divided into two co-adjacent cam surfaces, each reciprocating one of two groups of pistons likewise adjacent one another, and said cam surfaces are conveniently arranged to be substantially 180° out of phase with one another, whereby a good balance in oil displacement may be achieved in the coupling.

Due to the shape of the cam or cams it has been found that different oil volumes are received in the casing when the coupling is in the static condition, dependent upon the angular position of the cam or cams in relation to the filler plug. The oil should therefore, be introduced to a marked level when the cam or cams are in a known predetermined position relative to the filler opening in the outer casing.

In the drawings:

FIG. 1 is a longitudinal medial section of a single-cam coupling.

FIG. 2 is a half-section on the line II—II of FIG. 1.

FIG. 3 is a longitudinal medial section, partially in elevation, of a double-cam coupling.

FIGS. 4a and 4b are diagrammatic views of two types of radial apertures for the pressure cylinders.

FIG. 5 is a diagram of the radial porting arrangement for more than one piston group.

FIG. 6 is a partial section through a coupling with an alternative control valve arrangement.

FIG. 7 is a detail view of the valve shown in FIG. 6.

FIG. 8 is an axial cross section of the present coupling to show automatic means for operating the control valve of the coupling.

FIG. 9 is a half section across the axis of the coupling to show one of the centrifugal weight assemblies for operating the control valve automatically.

FIG. 10 is a cross section on the line 10—10 of FIG. 9.

FIG. 11 is a perspective view of a mounting for the centrifugally movable weights, and FIG. 12 is a perspective view of one of the centrifugally movable weights.

The coupling (see FIGS. 1 and 2) include two casing parts 11 and 12 bolted together with an intermediate external flange 13a of a cam 13 having a cam track 13b formed on its inner periphery. The housing parts 11 and 12 are attached to the end of an input shaft 14 which may be driven by a prime mover such as an internal combustion engine, started by use of a ring gear 15 on the housing 11 and 12.

An output shaft 20 is attached to a rotor 21 having a central (valve) chamber 21a and an end plate 22 with a flange 22g extending in spaced relation to a member mounted on the rotor and providing a number of cylinders 23, the flange and said member co-acting to define a groove 22h. The rotor 21 carries a member having a number of cylinders 23 each containing a displaceable piston 24 with a sealing member such as a ring 25 and each piston is urged outwardly by a spring 26. The outer end of each piston is pivoted by a pin 27 to a shoe 28 sliding on the cam track 13b, a guide plate 29 being provided to maintain the shoe 28 in alignment with the track 13b. The rotor end plate 22 has a coaxial extension 30 mounted in a bearing 31 and supported in an end of the input shaft 14. The output shaft 20 is mounted in a bearing 32 supported in an end plate 33 bolted to casing part 12, and having a seal 34 to the output shaft 20.

The shaft 20 has a bore 20a within which a valve rod 40 is longitudinally displaceable upon engagement of bore 40a in the rod with means (not shown) extending outwardly through a slot 20b in the shaft. The rod 40 is pinned at 41 to a sliding (control) valve 42 having its surface 42a fitting the chamber 21a in the rotor 21. Longitudinal displacement of the control valve 42 may cover, (as shown in FIG. 1), the inner ends of radial ducts 21b in the rotor 21, which are each aligned with a corresponding duct in one of the cylinders. (The actual shape of the duct 21b (see FIGS. 4a and 4b) is dependent upon the operational conditions to be met by the coupling.) The inner end of the control valve rod 40 has a longitudinal slot 40b and is slidable into and out of a counterbore 30b of an axial bore 30a in the rotor end plate extension 30, and a counterbore in the opposite end of the extension receives a pressure relief valve 43. Slot 40b and pressure relief valve 43 provide an outlet for air, excess oil or oil-air emulsion from control valve chamber 21a in the rotor.

Each cylinder 23 has a bore 23b through the side wall and near its base, the bore 23b being counterbored at 23c and at 23d and connecting the groove 22h with each cylinder 23. The cylinders 23 are arranged in a circle about the rotor and the groove 23h opens radially toward the casing periphery. An inlet member 45, having an axial bore, is fitted in each counterbore 23d and receives a floating replenishment valve 46.

The housing 12 has one or more filler apertures 12a, closed by a filler plug 48 and is provided with cooling fins 12c.

In operation, oil or other hydraulic medium is introduced into the casing 11, 12 and, depending upon the position of the control valve 42, power may be transmitted by the coupling to a greater or lesser extent. In the position of control valve 42 shown in FIG. 1, pistons 24 are substantially locked against movement relative to their respective cylinders 23 and a reaction occurs between shoes 28 and cam track 13b causing a maximum degree of drive between the input and output shaft. Replenishment valves 45, 46, ensure that leakage of oil from the cylinders is made good. When the control valve 42 is displaced to the left from the illustrated position (see FIG. 1), oil can pass to a greater or lesser extent to and from the cylinders and into and out of the valve chamber 21a, giving a graduated degree of drive between maximum and zero.

The present casing is shaped to provide substantial oil capacity in an annular midregion AB of substantial axial length and of a larger radius $r_1$ than the radius $r_2$ of the largest circle through the opening in the replenishment inlets 45; the midregion AB having a smaller radius $r_3$ than the radius $r_4$ of the smallest circle passing through said inlets. That portion of the casing radially within the midregion AB has the required capacity (4-inch radius) for accommodating the air when the oil is driven outward by rotation of the coupling and that portion above the midregion AB has the required capacity (25 cubic inches) for accommodating the air when the coupling is in the static condition.

The axial length of midregion AB is provided by axial offsetting of the radially inner casing portion 12i relative to its peripheral portion 12o. To provide an adequate reserve between the maximum filling of oil to the level defined by the filling aperture when in its top dead-center position and the level to which oil-refilling is essential, it is preferable that the mean effective axial length of the midregion AB shall be several times larger than the mean effective axial length of the peripheral portion of the casing radially outwardly from the midregion AB respectively. It is preferable also that radius $r_1$ shall be substantially larger than radius $r_2$ and that the radius $r_3$ shall be substantially smaller than radius $r_4$.

Also rotor end plate flange 22g has an inner radius not more than radius $r_4$ and an outer radius larger than radius $r_2$. Thus, as long as the flange 22g is immersed in oil, the replenishment inlets 45 are immersed in oil, even when the mean radius of the centrifuged oil is larger than the radius of the inlets, the inlets remaining immersed while the oil is in the centrifuged condition (until the inner radius of the centrifuged oil becomes greater than the greatest radius of the flange 22g).

The embodiment illustrated in FIG. 3 follows the same general design and principles as that of FIGS. 1 and 2 except that cam member 50 has two cam surfaces 51 and 52 with corresponding piston groups 53, 54 and the casing portions 11 and 12 are formed to provide annular reservoirs 55 and 56. The two cam tracks are in monoblock form, out of phase with each other by 180°. To avoid a couple being set up on control valve 42, the radial oil ducts 57 from each cylinder group are arranged to open on the same circumferential area of the valve chamber through slots 58. The slots are offset from the bores in the ends of the cylinder 59, 60 (see FIG. 5) and the two piston groups are out of phase with one another by an angle of 360°/n where n is the number of cylinders in all the piston groups. By staggering the cylinders in one group relative to an associated group, each cylinder has its own radial discharge port 57 into the valve chamber 21a.

The annular reservoirs 55-56 increase the volume of oil available during the operating condition, without affecting the static oil level and the air space. In filling the casing, the annular reservoirs would be completely filled with oil, while in the operating condition oil would be discharged by way of bores 61 to reduce the effective radius of the centrifuged oil and increase the volume of oil submerging the replenishment valves 45.

In the embodiment illustrated in FIG. 6, the axial bore 221a is no longer utilized as a pressure chamber and becomes a reservoir for oil in the static condition, oil passing freely from the chamber 221a to the outer casing by way of passages 70a through end plate 70. The pressure chamber in this embodiment is an annular groove 71a in the control valve 71, which groove 71a is in the alignment with the ducts 221b to all the cylinders 23, when the coupling is disengaged, and is displaced away from the ducts 221b (as shown in FIG. 6) when the coupling coupling is engaged. By this means, the oil discharged by the cylinders is restricted to the annular groove 71a and flows around the groove to the cylinders receiving oil. To restrict oil losses from the pressure side, the valve is provided with piston rings 74 and 75, split at 74a, 75a to allow release of air and a very small volume of oil from the pressure groove 71a to the reservoir. This construction also allows a simpler design of the end plate 70 in that the axial extension 130 projecting from the surface of plate 22, is solid, the bore 30b and pressure release valve 43 of FIG. 1 being omitted.

In the structure shown in FIG. 8, the coupling is generally as previously described except for minor improvements now described, and except for the automatic operator for the control valve. The end plate 22 of the rotor 21 is now made with a more solid boss or extension 230 than the similar boss in FIG. 1 (and the relief valve 43 is eliminated) but the bore remains and the valve rod 240 continues to be supported in the boss 230 so that the rod has two bearing points. The control valve 242 is now provided with several passages each having a valve seat member 80 held therein by a snap ring 81 and a valve 82 seating thereon in place of some of the previous transfer holes through the control valve body.

A pin 85 extends through the control valve rod 240 and engages at the ends in apertures in a sleeve 86, and is held in place by a cover 87 over the sleeve apertures. The sleeve carries a bearing 88 on which is mounted a ring 89 having ratchet teeth 90 formed therein at two points displaced by 180° and the rotor valve rod 240, the pin 85 and the sleeve 86, 87 do not affect movement of the rack member 89, 90. Radially outwardly from each of the racks 90 is placed a mounting 92 (see FIG. 11) adapted to be fixed on flanges 93 on the casing portion 212 (see FIG. 10), and which is provided with a flange 94 co-acting with the casing part 212 in providing an enclosed space. A weight 95 has side flanges 96 each formed with a boss 97 for severally holding a spring 98 seated at its upper end on bosses 99 on the mounting flange 94 when the weight is in place in the mounting. The weight 95 is movable radially of the coupling and has a rack 105 formed thereon to extend through a slot 106 in the mounting 92, the slot being formed between two flanges 107 extending from such mounting. The flanges 107 have pairs of aligned holes for severally receiving spindles for gears 108 and 109 which are in mesh. Gear 108 also meshes with rack 105 while the gear 109 also meshes with a rack 90.

At standstill or low speed, the springs 98 are expanded and the weights 95 are pressed toward the axis of the coupling. As the speed of rotation of the coupling increases, the upper weight, for example, moves outward under centrifugal force and the rack 105 rotates the upper gear 108 clockwise. The upper gear 108 drives the upper gear 109 in counter clockwise direction, and the converse action takes place in the lower unit. The gears 109 in mesh with the racks 90 move the ring 89 toward the right which moves control valve 42 toward the right to begin closing ducts 21b in the rotor cylinder. Such movement continues until the weights 95 reach the maximum outward position and the racks 90 reaches their farthermost righthand position. Thereafter as the speed decreases, reverse movements of the weights 95 and the gears 108, 109 and rack ring 89, 90 occur to move the valve rod 40 and the valve 42 toward the left to allow liquid flow through the ducts 21b into the cylinder.

The whole of the above control is enclosed within a casing part 112 which serves to receive liquid by way of one of several fillers 248. Substantially all the free space within the casing 112 is part of the inner region and of the midregion of the coupling casing as indicated in FIG. 1 hereof. In experimental use, the above construction is proving to be satisfactory on a bus operating on a heavily travelled and hilly route. Speed control has been satisfactory in city vehicular traffic and there has been no indication of undue heating of the coupling parts or of the liquid therein.

What is claimed is:

1. In a rotary hydraulic coupling for variably connecting a first shaft with a second shaft, a generally cylindrical casing on the first shaft for rotation therewith and having a cam track therein, a rotor co-axially of and spaced within the casing and on the second shaft for rotation therewith and including radial cylinders with pistons therein for bearing on the cam track, the rotor providing a center chamber for connecting the cylinders and for receiving liquid therefrom and supplying liquid under pressure thereto, the casing defining a peripheral region and an inner region about the rotor axis and a midregion radially between the peripheral and inner regions, the peripheral region having an aperture thereinto for filling the casing with liquid to a static level when the opening is above the midregion in one position of the casing relative to the rotor, the rotor providing a groove circumferential and external thereof within the casing midregion and opening radially and outwardly toward the casing periphery, valves extending axially of the rotor and opening into the groove for replenishing liquid leakage from the cylinders, the valves having their inlets connected by the rotor groove for exposure to substantially the liquid pressure of the peripheral region of the casing during the entire operation of the coupling, and a control valve movable axially in the rotor chamber for regulating liquid flow from the cylinders and thereby varying piston pressure on the cam track and the degree of coupling of the shafts.

2. The coupling of claim 1 in which the midregion extends both radially inwardly and radially outwardly of the replenishment valve groove whereby the liquid in the midregion continuously keeps the replenishment valve inlets immersed in liquid fiilling the rotor groove during operation of the coupling.

3. The hydraulic coupling of claim 1 in which the replenishment valve inlets are conical and the midregion is a space in substantially the form of a hollow cylinder having radii both larger and smaller respectively than the radii of the largest and smallest circles intersecting the replenishment valve inlets whereby the midregion is filled with liquid during coupling operation and extends radially beyond both sides of the valve inlets.

4. The coupling of claim 1 in which the volume of the casing space above the static level is less than that of the inner region whereby liquid fills the peripheral region and provides a reservoir in the midregion under liquid pressure of the peripheral region compensating for liquid leakage from the casing when the coupling is rotating.

5. The coupling of claim 1 in which the rotor includes an end plate having a hollow extension coaxial with the casing and with a vent to atmosphere and a control valve having a rod moving in the end plate extension for controlling the venting of air and liquid from the rotor dependent on the liquid pressure therein, and valve means are associated with the control valve rod for venting gas and gas-fluid mixtures from the rotor chamber.

6. In a rotary hydraulic coupling for variably connecting a first shaft with a second shaft, a generally cylindrical casing on the first shaft for rotation thereby and having a cam track therein, a rotor co-axially of and spaced within the casing and on the second shaft for rotation thereby and including radial cylinders with pistons therein for bearing on the cam track, the rotor providing a center chamber for connecting the cylinders and for receiving liquid therefrom and supplying liquid thereto, valves severally admitting liquid under pressure to the cylinders from the casing externally of the rotor, a control valve movable axially in the rotor chamber for regulating liquid flow from the chamber and thereby varying piston pressure on the cam track and the degree of coupling of the shafts, a sleeve axially movable on one of the shafts for movement of the rod, weights sliding on the casing radially in a straight line responsive to the speed of the first shaft, and means connecting the weights with the sleeve for movement of the rod in direct proportion to the radial movement of the weights.

7. The coupling of claim 6 in which the sleeve and the weights have racks and rotary gears severally connecting one sleeve rack with one weight rack, the ratio of the gears and of the racks and gears determining the rate of response of rod movement to weight movement.

References Cited by the Examiner
UNITED STATES PATENTS

| | | | |
|---|---|---|---|
| 1,609,429 | 12/1926 | Rockwell | 192—60 |
| 1,979,570 | 11/1934 | Paterson | 192—60 |
| 2,197,482 | 4/1940 | Popoff | 192—60 |
| 2,204,261 | 6/1940 | Fraser | 192—60 |
| 2,220,196 | 11/1940 | Andersen | 192—60 |
| 2,498,801 | 2/1950 | Fraser | 192—60 |
| 2,798,580 | 7/1957 | Lenz | 192—60 |

DAVID J. WILLIAMOWSKY, *Primary Examiner.*